United States Patent [19]

Page

[11] Patent Number: 4,983,953
[45] Date of Patent: Jan. 8, 1991

[54] G METER

[76] Inventor: Robert W. Page, 195B N. Fehr Way, Bay Shore, N.Y. 11706

[21] Appl. No.: 429,999

[22] Filed: Nov. 1, 1989

[51] Int. Cl.⁵ ............................................. B60Q 1/26
[52] U.S. Cl. ..................................... 340/467; 340/479
[58] Field of Search ............... 340/467, 479, 429, 463, 340/469, 471, 464

[56] References Cited

U.S. PATENT DOCUMENTS

| | | | |
|---|---|---|---|
| 3,157,854 | 11/1964 | Riley | 340/467 |
| 3,258,746 | 6/1966 | Bumpous | 340/467 |
| 3,332,060 | 7/1967 | Liljequist | 340/467 |
| 3,501,742 | 3/1970 | Ellison . | |
| 3,760,353 | 9/1973 | Hassinger . | |
| 3,813,542 | 5/1974 | Spadafora . | |
| 3,846,749 | 11/1974 | Curry | 340/467 |
| 4,170,723 | 10/1979 | Arsoy . | |
| 4,320,384 | 3/1982 | Carlson | 340/467 |
| 4,384,269 | 5/1983 | Carlson | 340/467 |
| 4,491,824 | 1/1985 | Chiou | 340/467 |
| 4,594,574 | 6/1986 | Thurman . | |
| 4,667,177 | 5/1987 | Athalye | 340/479 |
| 4,686,503 | 8/1987 | Miller . | |
| 4,730,181 | 3/1988 | Perkins . | |

Primary Examiner—Donnie L. Crosland
Assistant Examiner—Brent A. Swarthout
Attorney, Agent, or Firm—Leonard Belkin

[57] ABSTRACT

A rear end collision avoidance system utilizing a plurality of lamps facing the rear of the vehicle and a deceleration measuring device to sequence said lights so as to indicate the changes in speed of said vehicle. The system is actuated when the brake in the vehicle is applied. The measuring device utilizes a circular disk which is free to roll in a arc shaped slot.

8 Claims, 3 Drawing Sheets

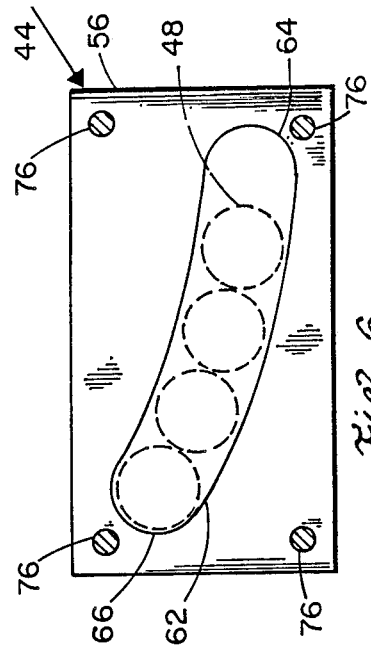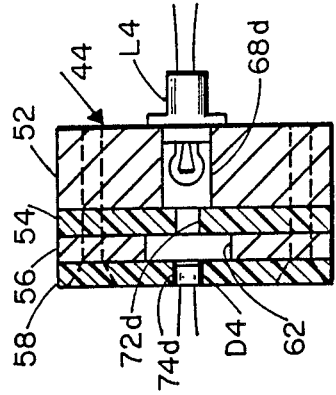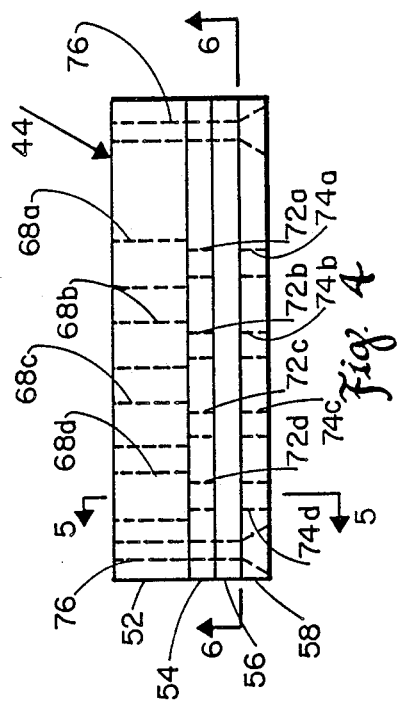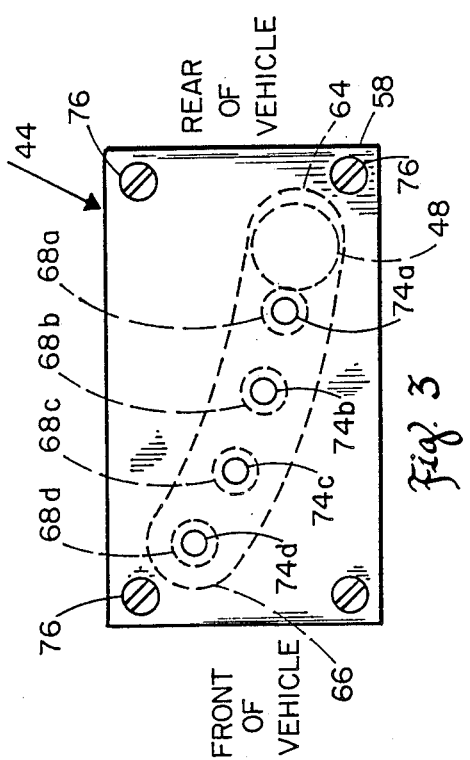

G METER

BACKGROUND OF THE INVENTION

This invention relates to apparatus for measuring and displaying the rate of deceleration of a vehicle for the benefit of the operator in the following vehicle.

The premise of the invention is that a driver needs better information about the motion of the car in front of him, especially if it is slowing down, and that brake lights do not tell him enough.

The driver following needs to know how quickly the car in front is slowing down. A lit brake light only means that the front driver has his foot on the brake; the driver behind does not know if the front car is decelerating mildly or whether it is coming to an urgent stop. The lit brake light looks the same in either case.

With automobiles traveling at high speeds and with spacing acknowledged to be unsafe but a fact of life due to crowded and congested highways, this ambiguity in brake lights can and sometimes does cause rear end collisions with consequent vehicular damage, human injury, loss of life, and further road congestion.

To deal with this problem a variety of designs have been offered in which additional brake lighting or other signaling is produced to indicate the so-called panic stop or that hard braking is occurring. These are shown in U.S. Pat. Nos. 3,760,353, 3,501,742, and 4,170,723. U.S. Pat. Nos. 3,813,542, 4,686,503, and 4,730,181 provide for signaling before actual braking takes place, while U.S. Pat. No. 4,594,574 teaches the use of separate lights to indicate braking when the vehicle is in motion.

None of the preceding patents teaches the present invention.

SUMMARY OF THE INVENTION

In this invention there is employed a display bar at the rear of the vehicle which shows changes in deceleration on a continuous basis by the operation of lights.

In a preferred embodiment of the invention there is provided a decelerometer which tracks the change in speed of the vehicle and will operate lights on the display bar. The lights on the display bar are arranged in a line so that as the lights illuminate and darken in sequence there is a direct indication to the driver in the next vehicle of the changing deceleration of the first vehicle.

The driver in the vehicle following then is able to react appropriately and adjust his braking to the degree required at the time and thus avoid dangerous traffic situations.

It is thus the principal object of this invention to provide apparatus to indicate to the driver of a vehicle following the relative rate of deceleration of the vehicle in front.

Other objects and advantages of this invention will hereinafter become obvious from the following description of preferred embodiments of this invention.

BRIEF DESCRIPTION OF THE DRAWINGS

FIG. 3 is an elevation side view of a sensor which may be employed as part of the preferred embodiment.

FIG. 4 is a top view of the sensor shown in FIG. 3.
FIG. 5 is a view along 5—5 of FIG. 4.
FIG. 6 is a view along 6—6 of FIG. 4.
FIG. 7 is an isometric view of the disk.

DESCRIPTION OF THE PREFERRED EMBODIMENTS

Figure 1:
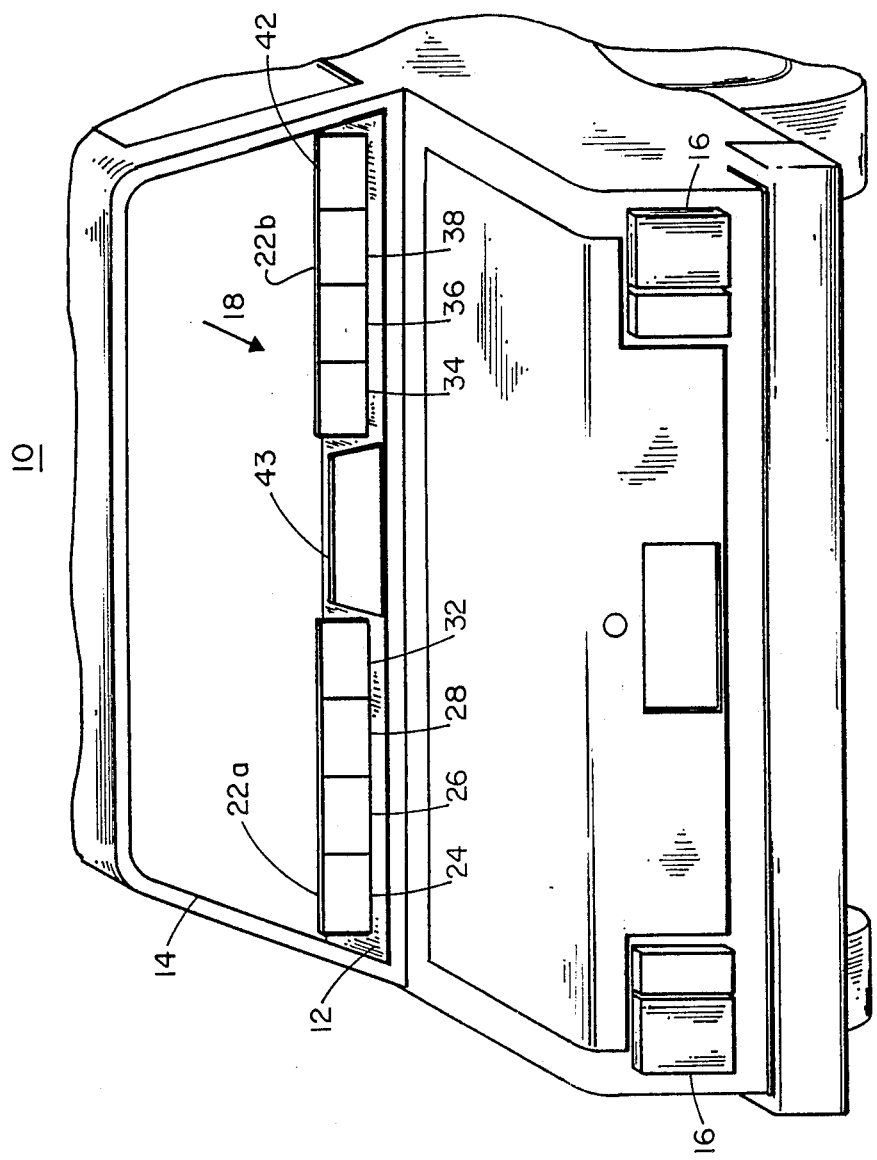
FIG. 1 is an isometric view of the rear of an automobile showing the use of the display bar forming a part of this invention.

Referring to FIG. 1 there is illustrated a automobile 10 having a rear deck 12, a rear window 14, and a set of brake lights 16 of conventional design. When the driver steps down on the brake pedal, a switch within automobile 10 will be closed and brake lights 16 will become illuminated.

The illumination of lights 16 does show to the driver in the following or rear car that the driver in the front car, that is, automobile 10, has his foot on the brake pedal. There is no information displayed, however showing how much effort is being applied to the brake pedal or how rapidly the automobile is decelerating if at all.

In accordance with the principles of this invention, a display bar 18 is mounted in such a fashion as to be visible to the driver in the vehicle following. Display bar 18 in this embodiment consists of a pair of extended housing members 22a and 22b having mounted therein a number of lamps 24, 26, 28, 32, 34, 36, 38, and 42 arranged in a row as illustrated. Lamp 43 may be the raised DOT-required stop light which would light up when brake lights 16 became illuminated.

As will be seen from the discussion which follows, the lamps are paired electrically, for example, lamps 32 and 34 light up together, lamps 28 and 36 light up together, lamps 26 and 38 light up together, and lamps 24 and 42 light up together. Each pair is symmetrical about the centerline. Also, as will appear later, each pair of lamps may be of a different color.

Figure 2:
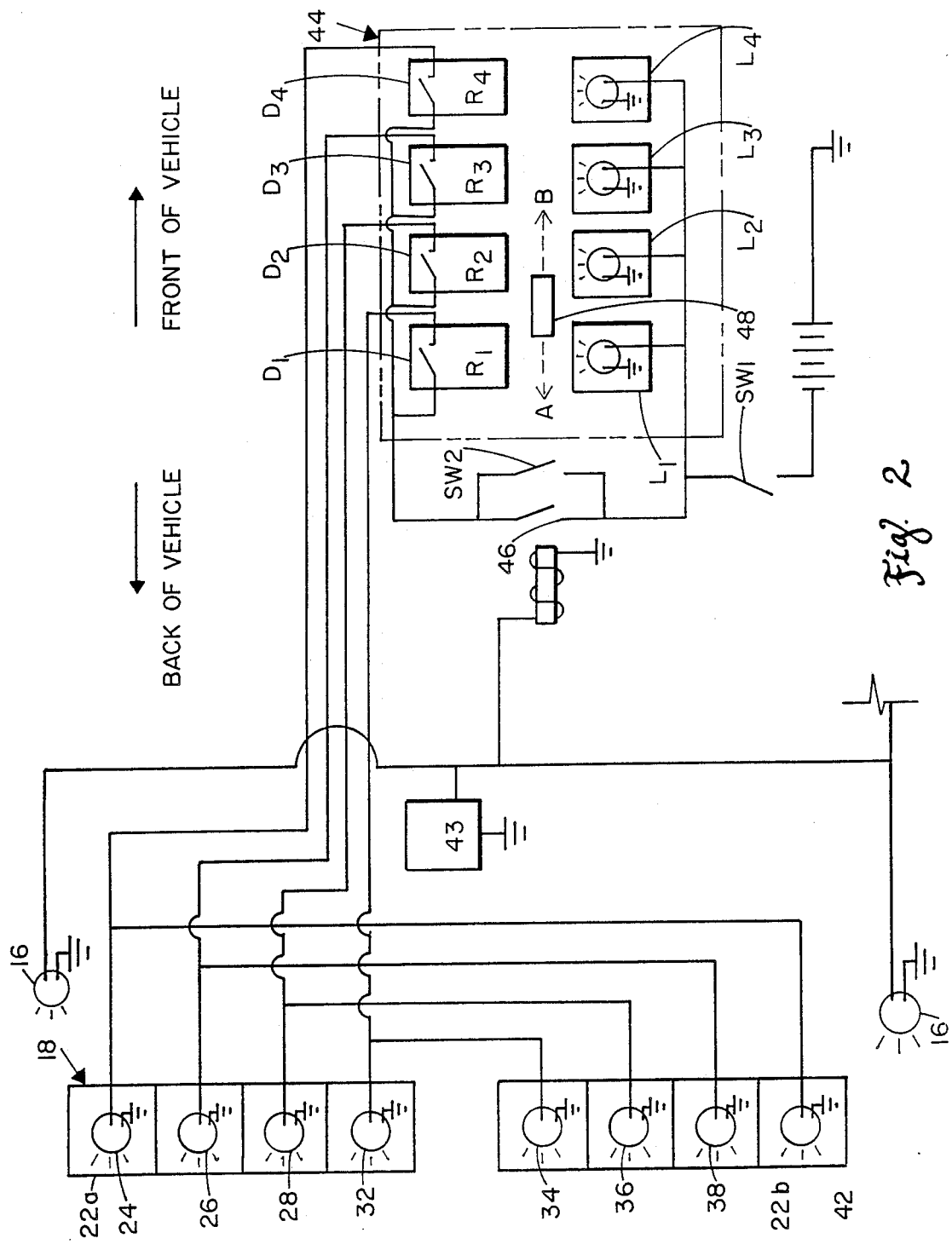
FIG. 2 is a schematic of the apparatus which controls the operation of the display bar.

For the details of the system affecting the operation of lamps 24-42, reference is made to FIG. 2 wherein is shown sensor 44 connected to display bar 18. Display bar 18 is enabled by a relay 46 which is closed when brake lights 16 are activated, that is, when the operator of vehicle 10 steps on the brake. An on-off switch SW1 connected between the battery and sensor 44 makes it possible for the operator to turn on or off the entire system, sensor 44 and display bar 18, when desired. Another switch SW2, in parallel with the switch operated by relay 46 may be provided if it is desired for the driver to have the option to maintain the system even in the absence of braking. The driver would exercise this option if deceleration could occur due to some other reason, such as, the result of down shifting.

Sensor 44 contains a disk 48 free to roll which moves in the directions shown by arrows A and B. When vehicle 10 is slowing down (i.e., decelerating), disk 48 will move in the forward direction, that is, the direction the vehicle is moving (to the right in FIG. 2) as shown by arrow B, whereas when the vehicle is moving at a steady rate of speed or accelerating, disk 48 will have a resting position toward the rear of sensor 44, shown by arrow A. The details of construction which determine the position and movement of disk 48 will be described later.

Within sensor 44 there are four electric eye circuits each consisting of a light source and a detector, for example, light L1 and detector D1, light L2 and detector D2, light L3 and detector D3, and light L4 and detector D4. Each of these detectors contains relays R1 to R4, respectively, which are connected to their related pair of lamps in display bar 18. That is, relay R1 in detector D1 is connected to lamps 32 and 34, so that when relay R1 is closed, lamps 32 and 34 will light up. In similar fashion, detector D2 is connected to lamps 28 and 36, detector D3 is connected to lamps 26 and 38, and detector D4 is connected to lamps 24 and 42.

In normal operation, switch SW1, the on-off switch for the whole system, is closed, switch SW2 is open, sensor 44 is operating but display bar 18 remains disabled until the driver steps on the brake, which results in relay 46 closing to make power available to display bar 18.

With switch SW2 closed, power would be available to display bar 18 all the time, independent of braking.

In normal operation, with switch SW2 open, and the driver stepping on the brake, closing relay 46 and enabling the display bar, still none of lamps 24-42 become lit until sufficient deceleration occurs to make disk 48 roll forward to block light to detector D1, causing the latter to close relay R1, which results in lights 32 and 34 becoming lit.

With vehicle 10 accelerating or moving at a steady rate, disk 48 is located to the extreme left of sensor 44 (that is, toward the rear of vehicle 10 as shown by arrow A in FIG. 2 and to the right as shown in FIG. 3) not blocking any of sensor lamps L1-L4. When the vehicle decelerates disk 48 acting as an inertial device starts to roll forward, causing the lights along display bar 18 to turn on and off reflecting the deceleration of the automobile.

As deceleration of the vehicle increases, disk 48 rolls further to the right (the forward direction of the vehicle as shown by arrow B shown in FIG. 2) blocking detectors D1-D4 in turn, thus turning on lamp pairs 28/36, 26/38, and 24/42 in sequence in accordance with the degree of deceleration taking place. As will be seen from the discussion below, disk 48 is positioned in accordance with the rate of deceleration, so that at maximum deceleration disk 48 is at the far right blocking the light between lamp L4 and detector D4, lighting up lamp pair 24/42. At somewhat less deceleration, disk 48 would block light between lamp L3 and detector D3 causing lamp pair 26/38 to light up and lamp pair 24/42 would then shut down. In practice, disk 48 might be rolling back and forth in accordance with the movement and change of speed of the vehicle and the lamps in display bar 18 would reflect these changing conditions with different pairs of lamps lighting up and shutting down, presenting a dynamic picture to the car following of the changing motion of the vehicle in front. Since it takes a finite range of deceleration for disc 48 to pass through a particular light beam, it is seen that the glowing of a particular lamp in display bar 18 represents a particular range of deceleration.

For the details of how disk 48 moves in the manner described, reference is made to FIGS. 3 to 7.

Sensor 44 consists of an assembly of flat rectangular members 52, 54, 56 and 58. Member 56 shown best in FIG. 6 contains an arc-shaped slot 62 in which disk 48 rides. Disk 48 is a circular disk made of a suitable metal such as aluminum. Slot 62 is shaped in the form of a circular arc starting at one end 64 which is the lowest part of the arc and therefore the resting position of disk 48 when the vehicle is not decelerating. Slot 64 curves upwardly toward the front of the vehicle so that its highest point is at the other end 66. As vehicle 10 decelerates, disk 48 tends to move toward the front of the vehicle rising as it moves further toward the front of the vehicle, its position along slot 62 being thus determined by the deceleration at that instant.

Member 52 is provided with four sockets 68a, 68b, 68c, and 68d to accommodate lamps $L_1$ to $L_4$, respectively, spaced and centered along slot 62. Member 52 may be constructed from aluminum.

Member 54, which may be constructed from a suitable plastic such as Delrin, is provided with smaller holes 72a, 72b, 72c and 72d aligned with sockets 68a to 68d, respectively, to narrow and direct the light beams from lamps $L_1$ to $L_4$, respectively through slot 62.

Member 58 which may also be constructed from a suitable plastic such as Delrin, is provided with sockets 74a, 74b, 74c and 74d also aligned with openings 72a to 72d and 68a to 68d, respectively, to mount detectors $D_1$ to $D_4$, respectively.

Members 52 to 58 are sandwiched together as illustrated and held together by bolts or screws 76.

When vehicle 10 is not decelerating, disk 48 is in its initial resting position at end 64 of slot 62, not blocking light between lamp $L_1$ and detector $D_1$. When the vehicle starts to decelerate disk 48 will start to roll forward and position itself along slot 62 depending on the rate of deceleration.

Assuming braking is occurring and relay 46 is closed, when disk 48 blocks the light from lamp $L_1$ to detector $D_1$, then lamps 32/34 on display bar 18 will light up, and similarly, so would lamp pairs 28/36, 26/38 or 24/42 depending on the position of disk 48 along slot 62. As disk 48 rolls along slot 62, the flashing on and off of light pairs makes an aggregate impression of light moving out and in on the display bar, indicating to the vehicle behind the changing deceleration of the front vehicle.

In the event the driver operates the vehicle with switch SW2 closed, then power&is always available to display bar 18 so that if deceleration of the vehicle occurs as the result of other causes as well as braking, the lights on display bar 18 will indicate the deceleration. Other possible causes of deceleration are rapid downshifting, an obstacle in the road, engine malfunction, etc.

It is understood that other types of decelerometers may be employed with display bar 18 to activate its lamps to carry out the principles of this invention, and that other arrangements of the lamps are also possible. The lamps on display bar 18 may be color coded to improve their usefulness. For example, lamps 32 and 34 may be yellow, lamps 28 and 36 may be yellow-amber, lamps 26 and 38 may be red-amber, and lamps 24 and 42 may be red. The lamps also may be spaced in a different arrangement if desired.

It is seen from the description above that this invention differs from the usual brake light in several important respects. While the conventional brake lights are static in that they glow only when the brake is being applied, in the present invention there is provided a dynamic system which displays changes according to the change in speed of the vehicle.

With the present invention many rear end collisions will be avoided. A driver braking hard for an unexpected obstacle in the road, a driver who decides to make a left turn on a road where there is not enough room for others to pass on his right, a driver who momentarily lets his attention wander and has to slow quickly, a driver looking for patterns of deceleration in the traffic before him, all benefit from the use of this invention.

While only certain preferred embodiments of this invention have been described it is understood that many variations are possible without departing from the principles of this invention as defined in the claims which follow.

I claim:

1. A rear end collision avoidance system for a vehicle comprising:
    a. means for displaying a series of rearward facing lamps, said lamps being arranged in a horizontal row in which a first pair of lamps represents a rate of deceleration, a second pair of lamps located on opposite sides of said first pair of lamps in said row closer to the sides of said vehicle representing an increased rate of deceleration, and a third pair of lamps located on opposite sides of said second pair of lamps in said row closer to the sides of said vehicle representing a further increase in the rate of deceleration;
    b. deceleration measurement means comprising sensor means to detect and measure the rate of deceleration of said vehicle within said vehicle for actuating said displaying means to cause said pairs of lamps to light up and turn off sequentially in opposite directions along said row in accordance with increasing and decreasing deceleration of said vehicle so that the glowing of a particular pair of lamps replaced by the glowing of an adjacent pair of lamps unambiguously represents a particular range and change of deceleration; and
    c. means for activating said displaying means upon the application of the brake within said vehicle so that said displaying means operates continuously to indicate the rate of deceleration until said brake is released.

2. The rear end collision avoidance system of claim 1 wherein said lamps remain unlit unless and until said vehicle decelerates and brakes of said vehicle are applied.

3. The rear end collision avoidance system of claim 2 wherein said sensor means comprises an array of photo conductive cells and lights, and means for interrupting light paths from said lights to said cells in accordance with the rate of deceleration of said vehicle.

4. The rear end collision avoidance system of claim 3 wherein said interrupting means comprises a slot and inertial means free to move within said slot in accordance with changes in deceleration of said vehicle.

5. The rear end collision avoidance system of claim 4 wherein said slot is oriented so that said inertial means rises as said deceleration increases.

6. The rear end collision avoidance system of claim 5 wherein said inertial means comprises a circular disk free to roll in said slot.

7. The rear end collision avoidance system of claim 6 wherein said lamps are color coded according to the rates of decleration.

8. The rear end collision system of claim 1 having manually operable switch means in parallel with said activating means to enable the avoidance means and hence said displaying system to function in the absence of braking.

* * * * *